INVENTORS:
WILLIAM C. BROWNING,
ALPHONSE C. PERRICONE,
LIDA LACY EDMUNDSON,
BY Kingsland, Rogers, Ezell & Robbins
ATTORNEYS

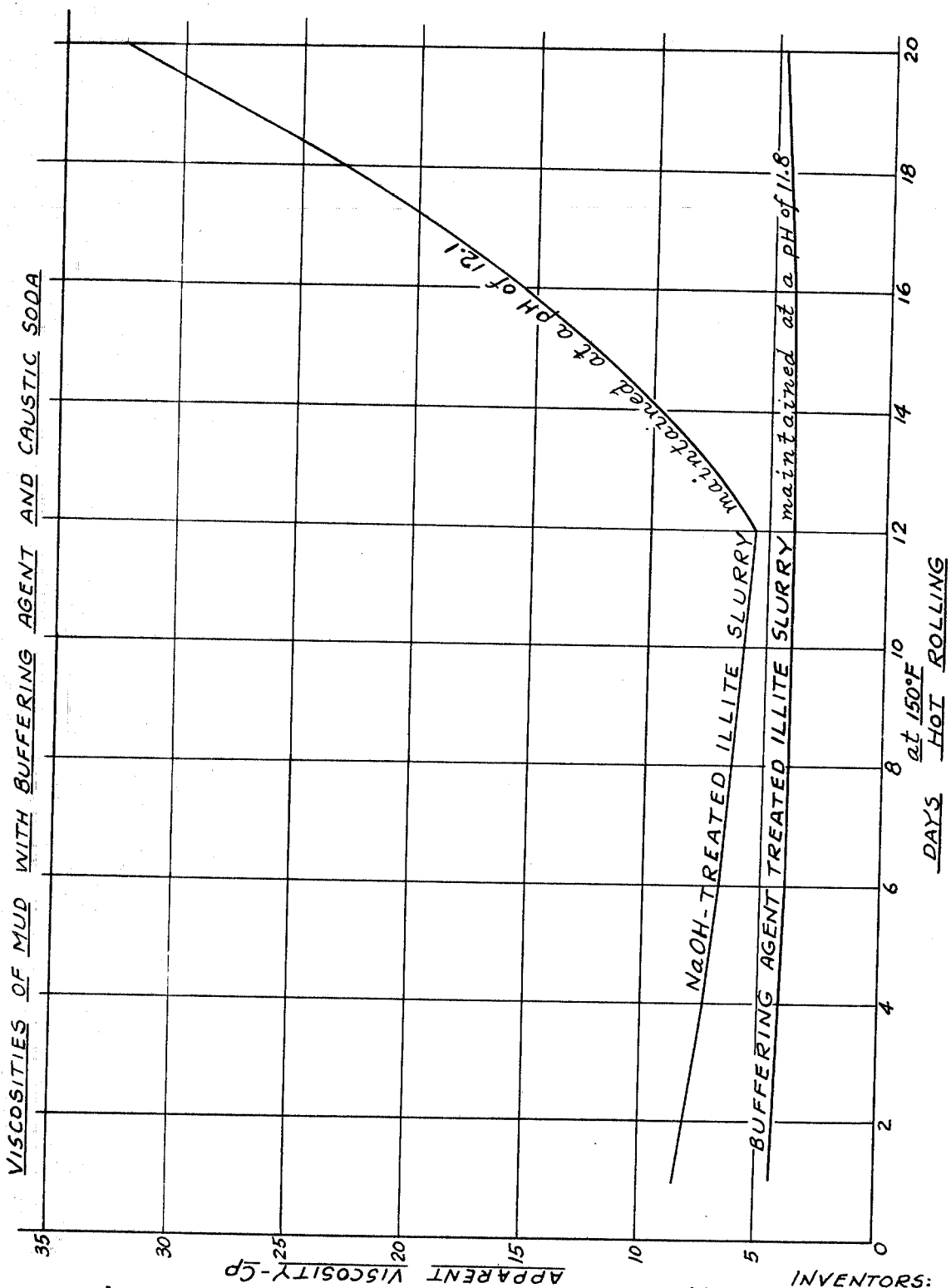

United States Patent Office

3,511,779
Patented May 12, 1970

3,511,779
BUFFERED DRILLING MUD ADDITIVE
William C. Browning, Alphonse C. Perricone, and Lida Lacy Edmundson, Houston, Tex., assignors to Milchem Incorporated, Houston, Tex., a corporation of Delaware
Continuation-in-part of application Ser. No. 344,770, Feb. 13, 1964. This application Mar. 14, 1968, Ser. No. 715,477
Int. Cl. C10m 3/44
U.S. Cl. 252—8.5
6 Claims

ABSTRACT OF THE DISCLOSURE

Drilling mud additives formed from compounds comprising an organic polyelectrolyte, sodium silicate and alkali metal hydroxide. Additives of this invention may be formed by mixing the three components in solution and the reaction product may then be added to drilling mud either in solution or as a dry product.

CROSS-REFERENCE TO RELATED APPLICATIONS

This application is a continuation-in-part of application No. 344,770, filed Feb. 13, 1964 now abandoned.

BACKGROUND OF THE INVENTION

Field of the invention

This invention relates to improvements in drilling mud additives and in particular is concerned with drilling mud additives that function as pH buffering agents in the drilling mud and provide long-term stability and inertness to formation clays.

Description of the prior art

Drilling muds generally contain various types of organic polyelectrolytes and other components. Such organic polyelectrolytes are organic oil insoluble hydrophilic materials and they include various lignosulfonates, lignites and polyphenolic compositions. The lignosulfonates used in drilling muds are produced by the reaction of lignin with sulfonic acid or sulfite salt. Lignosulfonates are customarily produced by treating lignin contained in wood chips with sodium bisulfite to produce a liquor containing lignosulfonate which is removed from the insoluble residue and purified in various degrees primarily by the removal of sugars. Lignosulfonates known in the oil drilling art sold under the trademarks "Uni-Cal," "Q-Broxin," "Kembreak" and "Peltex." Lignite as used in drilling muds is the organic mineral which is usually processed only by treatment with sodium hydroxide to render it water soluble. Commercial examples of such lignites are known by the trademarks "Ligco," "Carbonox," and "Tannathin." Suitable polyphenolic compositions are produced from bark and wood from various trees by leaching with hot water to remove tannin and other water soluble compounds. Some manufacturers merely dry the leached material to produce a commercial product, and other manufacturers process or treat the extracts in various ways to produce proprietary products. Commercial examples of the polyphenolic compositions are available under trademarks such as "Rayflo," "Mil-Flo," and "Palcotan." "Mil-Flo" and "Rayflo" have been described by the manufacturer as products derived from hemlock bark and that they comprise modified copolymers of catechin and leucocyanidin with a high content of phenolic hydroxyls. "Palcotan" is a causticized tannin product.

The efficient performance of most commercial mud conditioning agents of the organic polyelectrolyte class, including lignosulfonates and lignite types, and bark extracts and derivatives, is dependent upon the proper alkaline environment. This has necessitated the use of caustic soda or other alkali in the past to provide the proper solubility characteristics for increased colloidal stabilization of the suspended solids. Unfortunately the alkalinity afforded by the caustic soda is accompanied by certain disadvantages to the mud system through adverse chemical reactions with the clay formation of the bore hole, and it is a particularly hazardous chemical which, if not handled carefully, can cause severe damage to the skin and eyes.

Further, the buffer capacity of caustic soda is almost non-existent and the addition of caustic induces extreme pH changes in localized areas which accelerate clay reactions causing cleavage and greater surface area which subsequently affects the rheology of the mud system. Moreover, when caustic soda is used, its extreme solubilizing tendency can frequently impair the efficiency of a thinner, both from a dispersant and filtration control point of view. Other alkaline materials, such as lime hydrate, soda ash, and sodium silicates, have found only limited use, and none of these materials in themselves are completely adequate. Sodium silicates have been used to deflocculate clay suspensions, particularly in the ceramic arts, but they are only effective for such purpose for clays free of calcium ions. The calcium ion content of clays used in drilling muds is usually too high for sodium silicate to function as an effective defloculent.

SUMMARY OF THE INVENTION

The buffered drilling mud additive of the instant invention meets the above noted problems and is capable of furnishing the required alkalinity and eliminating, or at least reducing very significantly to a workable level, the above caustic soda disadvantages and has made possible the complete activation and control of the rheology and pH of organic polyelectrolyte muds.

By means of this invention there has been provided a buffered drilling mud additive formed from an organic polyelectrolyte, a silicate, and alkali, which can be added to a drilling mud to provide a control means for the pH in a desired range, and to provide improved long-term stability and inertness to formation clays. The drilling mud additive is characterized by its simple and accurate pH control and absence of adverse reaction with the drilling formation clay. In addition, protection against corrosion is provided through the employment of the sodium silicate.

As previously noted, it is desirable that drilling muds containing various organic polyelectrolytes be maintained at an alkaline pH. Through this invention the buffered drilling mud additive can be employed to provide improved long-term stability and inertness to formation clays, while at the same time controlling the pH and preventing undesirable formation clay reactions and inhibiting corrosion. Essentially, the buffered drilling mud additive is a reaction product formed from potassium hydroxide, an organic polyelectrolyte and a sodium silicate of a controlled sodium oxide to silicon dioxide proportion. The buffered drilling mud additive is alkaline in nature and, through the employment of potassium hydroxide as the alkali ingredient, less swelling is encountered with the clays than where free sodium hydroxide or caustic soda is employed.

The buffered drilling mud additive of this invention is compatible with various types of organic polyelectrolytes and other components contained in the drilling mud. Such organic polyelectrolytes are conventionally organic oil insoluble hydrophilic materials, such as the various lignosulfonates or polyphenolic compositions.

The above features are objects of this invention and further objects will appear in the detailed description which follows and will be otherwise apparent to those skilled in the art.

BRIEF DESCRIPTION OF THE DRAWINGS

For the purpose of illustration of this invention, there are shown in the accompanying drawings various curves and diagrams showing the properties of the buffered drilling mud additive of this invention. It is to be understood that these drawings are for the purpose of example only and that the invention is not limited thereto.

In the drawings:

FIG. 4 shows the comparative viscosity of a mud with the buffered drilling mud additive and caustic soda after hot rolling and after varying periods of time.

DESCRIPTION OF PREFERRED EMBODIMENTS

Figure 1:
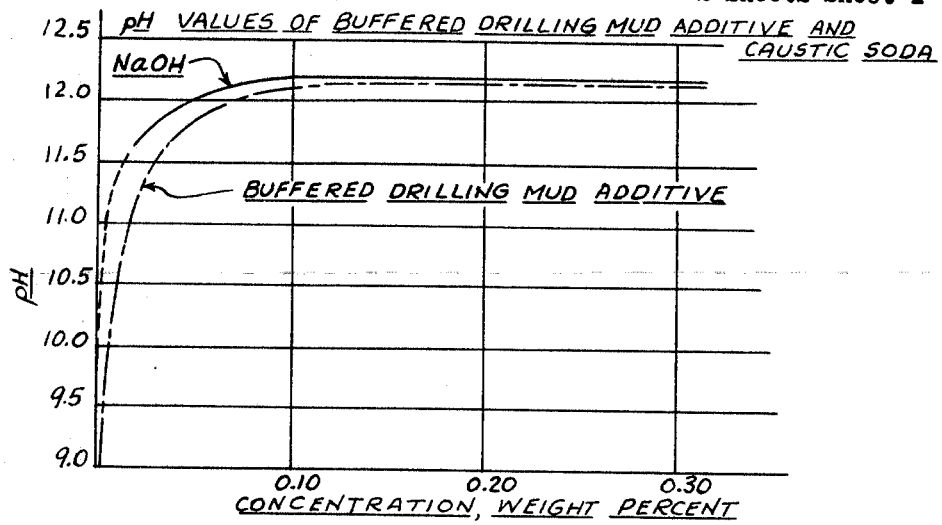
FIG. 1 shows a curve giving the comparative pH values of the buffered drilling mud additive and caustic soda at different weight percent concentrations.

The buffered drilling mud additive of this invention is essentially an alkali-organic-silicate compound. The organic ingredient is an organic polyelectrolyte comprising about 2 to 30% by weight, while the silicate ingredient is a sodium silicate of about 40 to 78% by weight. Such alkali is preferably potassium hydroxide of about 5 to 30% by weight of the composition. The additive may be in either dry or liquid form and when liquid may be about 50% solids.

The organic polyelectrolyte is an organic oil insoluble hydrophilic material, such as the various lignosulfonates known in the drilling art under the trademarks Uni-Cal, Q-Broxin, Kembreak, Peltex, etc., or lignites known as Ligco, Carbonex, Tannathin, or various bark extracts and polyphenolic compositions known as Rayflo, Mil-Flo, Palcotan, etc. Although these various organic polyelectrolytes may be employed, it has been found particularly desirable to use an organic polyelectrolyte obtained as a bark extract derivative in the form of a sulfonate salt of hydroxy aromatic polymeric compounds obtained from Douglas fir, Amabilis fir and Southern pine, sold, as an example, under the trademark Rayflo and described in U.S. Pat. No. 2,999,108. The general weight percent of the organic polyelectrolyte in the drilling mud additive is about 2 to 30%. When the drilling mud additive is used as a dried material, the organic polyelectrolyte may desirably be at the lower range, such as 2½%, and, when used as a liquid product, may be at the higher range, such as 30%.

The sodium silicate employed is in a form in which the molar proportion of sodium oxide to silicon dioxide is in the range of 0.3 to $3Na_2O:1SiO_2$, and preferably in a narrower range of 0.5 to $2Na_2O:1SiO_3$. Sodium orthosilicate, that is $2Na_2O:1SiO_2$ has been found to be particularly desirable, although other forms within the ranges described above can be satisfactorily employed. The alkali employed is preferably potassium hydroxide. It has been found that the potassium ion tends to fix to the clay formation and does not cause undesirable clay formation reactions and swelling to the extent that sodium does. The potassium hydroxide employed is in the range of 5 to 30% by weight of the composition and an excess over this range is to be avoided as flocculation may be encountered. It is preferred that potassium hydroxide be employed as the alkali, but a minor proportion of sodium hydroxide may be employed with the potassium hydroxide for economy reasons and to provide increased alkalinity.

There are shown in the examples below typical means for preparing the drilling mud additive of this invention.

Example 1

|  | Weight Percent | Pounds Added on a Dry Basis |
|---|---|---|
| Sodium Orthosilicate | 45 | 1,125 |
| Rayflo | 25 | 625 |
| Potassium Hydroxide | 20 | 500 |
| Sodium Hydroxide | 10 | 250 |
|  |  | ¹ 2,500 |

¹ Dry solids.

The sodium orthosilicate ($2Na_2O:1SiO_2$) may be prepared in a separate tank by adding 974 pounds of sodium metasilicate ($1Na_2O:1SiO_2$) followed by the addition of 760 pounds caustic soda. This resultant sodium orthosilicate solution will have a 65% total solids concentration. The sodium metasilicate solution added will add 609 pounds of water which is subtracted from the 2500 pounds of total water to be added. The other materials are added on an anhydrous basis.

In a separate container 1141 pounds of water is added followed by 625 pounds of Rayflo. This Rayflo solution contains 35.4% total solids. When the Rayflo has completely dissolved the 1000 pounds of 50% caustic potash solution is added, together with 500 pounds of caustic soda solution and the mixture is well blended.

The Rayflo solution is reacted with the sodium orthosilicate solution with agitation and the finished product is then put into a five gallon can, which will contain approximately 59 pounds of a 50% finished buffered drilling mud additive solution, i.e., about 11.8 pounds per gallon.

Example 2

| | Percent |
|---|---|
| Orthosilicate | 90 |
| Potassium hydroxide | 7 |
| Rayflo | 3 |

In this example, 72% sodium metasilicate (having a solids content of 58%) was heated to 180° F. To this was added 28% crystal caustic having 76% $Na_2O$. These two materials reacted to give 100% orthosilicate.

The Rayflo (an organic polyelectrolyte) solution was prepared by putting the Rayflo into a potassium hydroxide solution having 60% solids. The weight ratio of potassium hydroxide solution to Rayflo was 2.55:1.

The sodium orthosilicate solution was added, immediately after its preparation, to the Rayflo-KOH solution. These two solutions were added together in proportions such that the final composition on a weight basis would be 90% sodium orthosilicate, 7% KOH and 3% Rayflo. After reaction of the sodium orthosilicate and the Rayflo-KOH, the solution was promptly transferred to a drying plate where it was dried for about three minutes at 325° F.

The dried product of Example 2 as compared to the liquid product of Example 1, although providing some desirable advantages such as ease in handling, was not quite as satisfactory in operation. Thus, flow properties were not quite as satisfactory and the water loss was more significantly reduced when the product of Example 1 was employed for pH control.

Comparative results are shown in Table 1 below for the products of Examples 1 and 2 contrasted with the use of sodium hydroxide and sodium orthosilicate. These alkali constituents were employed in a mud composition of 40% illite to which was added 4 grams Uni-Cal and a sufficient quantity of the alkali constituents to adjust the pH to 9.5. The Uni-Cal product is a specially prepared lignosulfonate containing chromium. Flow properties were measured initially by conventional Fann viscometer readings, and again after hot rolling before and after adjustment of pH. In the tests in which the results showing satisfactory performance and improved flocculation are reported in Table 1 below, the total cumulative quantity of the alkaline constituents added for pH adjustment was as follows:

NaOH=12.6 cc. (1 ml.=0.25 g.)=3.15 g.
Na orthosilicate=6.3 g.
Example 1=12.8 g. (50%) solution=6.4 g.
Example 2=6.44 g.

TABLE 1

DATA:
Base Mud: Illite.
Treatment: 4 g. Uni-Cal + pH Control Agent.

| | NaOH | Ortho-silicate | Ex. 1 | Ex. 2 |
|---|---|---|---|---|
| Amount, grams | ¹8.0 | 3.4 | 9 | 3.57 |
| 600 Fann Rdg | 32.5 | 29 | 28 | 25 |
| 300 Fann Rdg | 21 | 18 | 15.5 | 15 |
| 200 Fann Rdg | 17 | 15 | 11.5 | 12 |
| 100 Fann Rdg | 12 | 10 | 7 | 8 |
| 6 Fann Rdg | 7 | 4 | 1 | 3.5 |
| 3 Fann Rdg | 6 | 4 | 0.5 | 3 |
| IG, lb./100 sq. ft | 1 | 1 | 0 | 0 |
| pH | 9.5 | 9.4 | 9.8 | 9.5 |
| pH After Hot-Rolling: | | | | |
| Before Stirring | 8.0 | 7.9 | 8.3 | 7.9 |
| pH Adjusted with following amount of alkaline constituent, grams | ¹1.2 | .75 | 2.0 | 0.75 |

Flow Properties after Hot-Rolling and pH Adjustment

| | NaOH | Ortho-silicate | Ex. 1 | Ex. 2 |
|---|---|---|---|---|
| 600 Fann Rdg | 21.5 | 22 | 20 | 20 |
| 300 Fann Rdg | 12.5 | 13.5 | 10 | 12 |
| 200 Fann Rdg | 9.5 | 10.5 | 7 | 9 |
| 100 Fann Rdg | 6 | 6 | 4 | 6 |
| 6 Fann Rdg | 2 | 2.5 | 1 | 2 |
| 3 Fann Rdg | 1.5 | 2 | 0.5 | 1.5 |
| IG, lb./100 sq. ft | 0 | 0 | 0 | 0 |
| 10G, lb./100 sq. ft | 18 | 50 | 5 | 37 |
| pH | 9.5 | 9.5 | 10.2 | 9.6 |

Flow Properties after 16 Hours Hot-Rolling

| | NaOH | Ortho-silicate | Ex. 1 | Ex. 2 |
|---|---|---|---|---|
| 600 Fann Rdg | 20 | 19 | 22 | 19 |
| 300 Fann Rdg | 11 | 10.5 | 10.5 | 10 |
| 200 Fann Rdg | 8 | 8 | 7 | 7 |
| 100 Fann Rdg | 5 | 5 | 4 | 4 |
| 6 Fann Rdg | 1 | 1 | 1 | 1 |
| 3 Fann Rdg | 1 | 1 | 1 | 1 |
| IG, lb./100 sq. ft | 0 | 0 | 0 | 0 |
| 10G, lb./100 sq. ft | 6 | 9 | 1 | 5 |
| pH | 8.2 | 8.0 | 8.7 | | pH Readjusted and Flow Properties Measured Again

| | NaOH | Ortho-silicate | Ex. 1 | Ex. 2 |
|---|---|---|---|---|
| Amount gram | ¹1.0 | .75 | 1.0 | 0.75 |
| 600 Fann Rdg | 22 | 22 | 22 | 21 |
| 300 Fann Rdg | 14 | 13.5 | 11 | 15 |
| 200 Fann Rdg | 10 | 10 | 8 | 12 |
| 100 Fann Rdg | 7 | 7 | 4 | 8 |
| 6 Fann Rdg | 2 | 2 | 1 | 3.5 |
| 3 Fann Rdg | 2 | 2 | 0.5 | 3 |
| IG, lb./100 sq. ft | 0 | 0 | 0 | 0 |
| pH | 9.6 | 9.6 | 10.2 | 9.8 |

Flow Properties after Hot-Rolling 11 Hours

| | NaOH | Ortho-silicate | Ex. 1 | Ex. 2 |
|---|---|---|---|---|
| 600 Fann Rdg | 19 | 18 | 22 | 20 |
| 300 Fann Rdg | 10.5 | 10 | 11 | 10.5 |
| 200 Fann Rdg | 8 | 7.5 | 8 | 7.5 |
| 100 Fann Rdg | 4.5 | 4.5 | 4 | 4 |
| 6 Fann Rdg | 1 | 1 | 1 | 0.5 |
| 3 Fann Rdg | 1 | 1 | 1 | 0.5 |
| IG, lb./100 sq. ft | 0 | 0 | 0 | 0 |
| 10G, lb./100 sq. ft | 8 | 8 | 1 | 6 |
| pH | 8.6 | 8.5 | 9.3 | 8.7 |

Flow Properties after pH Adjustment

| | NaOH | Ortho-silicate | Ex. 1 | Ex. 2 |
|---|---|---|---|---|
| Amount, gram | ¹0.7 | 0.5 | 0.2 | 0.5 |
| 600 Fann Rdg | 21 | 22 | 20 | 28 |
| 300 Fann Rdg | 13 | 13 | 10 | 17 |
| 200 Fann Rdg | 10 | 10 | 7 | 13 |
| 100 Fann Rdg | 6 | 7 | 4 | 9 |
| 6 Fann Rdg | 2 | 2 | 1 | 4 |
| 3 Fann Rdg | 2 | 2 | 1 | 4 |
| IG, lb./100 sq. ft | 0 | 0 | 0 | 1 |
| pH | 9.6 | 9.5 | 9.5 | 9.9 |

Properties After Hot-Rolling

| | NaOH | Ortho-silicate | Ex. 1 | Ex. 2 |
|---|---|---|---|---|
| 600 Fann Rdg | 21 | 19 | 22 | 20 |
| 300 Fann Rdg | 12 | 10 | 11 | 11 |
| 200 Fann Rdg | 8 | 8 | 7 | 8 |
| 100 Fann Rdg | 5 | 5 | 4 | 5 |
| 6 Fann Rdg | 1 | 1 | 1 | 1 |
| 3 Fann Rdg | 1 | 1 | 1 | 1 |
| IG, lb./100 sq. ft | 0 | 0 | 0 | 0 |
| 10G, lb./100 sq. ft | 8 | 8 | 1 | 7 |
| pH | 8.4 | 8.6 | 9.0 | 8.8 |

Flow Properties After pH Adjustment

| | NaOH | Ortho-silicate | Ex. 1 | Ex. 2 |
|---|---|---|---|---|
| Amount, gram | ¹0.7 | 0.5 | 0.25 | 0.5 |
| 600 Fann Rdg | 21 | 30 | 20 | 30 |
| 300 Fann Rdg | 12 | 19 | 10 | 20 |
| 200 Fann Rdg | 9 | 15 | 7 | 16 |
| 100 Fann Rdg | 5.5 | 11 | 4 | 12 |
| 6 Fann Rdg | 1.5 | 5 | 1 | 7 |
| 3 Fann Rdg | 1 | 5 | 1 | 7 |
| IG, lb./100 sq. ft | 0 | 1 | 0 | 3 |
| pH | 9.6 | 9.6 | 9.8 | 10.1 |

Flow Properties After Hot-Rolling

| | NaOH | Ortho-silicate | Ex. 1 | Ex. 2 |
|---|---|---|---|---|
| 600 Fann Rdg | 22.5 | 22 | 22.5 | 23 |
| 300 Fann Rdg | 12 | 11.5 | 11.5 | 12 |
| 200 Fann Rdg | 9 | 8.5 | 8 | 9 |
| 100 Fann Rdg | 5 | 5 | 4 | 5 |
| 6 Fann Rdg | 1 | 1 | 0.5 | 1 |
| 3 Fann Rdg | 1 | 1 | 0.5 | 1 |
| IG, lb./100 sq. ft | 0 | 0 | 0 | 0 |
| 10G, lb./100 sq. ft | 8 | 9 | 1 | 9 |
| pH | 8.8 | 9.2 | 9.1 | 9.3 |

Flow Properties After pH Adjustment

| | NaOH | Ortho-silicate | Ex. 1 | Ex. 2 |
|---|---|---|---|---|
| Amount, gram | ¹0.5 | 0.2 | 0.2 | 0.2 |
| 600 Fann Rdg | 22 | 24 | 19.5 | 27.5 |
| 300 Fann Rdg | 13 | 13.5 | 10 | 16 |
| 200 Fann Rdg | 9.5 | 10.5 | 7 | 11.5 |
| 100 Fann Rdg | 6 | 6.5 | 3.5 | 7 |
| 6 Fann Rdg | 1.5 | 1.5 | 0 | 2 |
| 3 Fann Rdg | 1 | 1 | 0 | 2 |
| IG, lb./100 sq. ft | 0 | 0 | 0 | 0 |
| pH | 9.6 | 9.7 | 9.5 | 9.9 |

Flow Properties After 16 Hours Hot-Rolling

| | NaOH | Ortho-silicate | Ex. 1 | Ex. 2 |
|---|---|---|---|---|
| 600 Fann Rdg | 21 | 21 | 22 | 24 |
| 300 Fann Rdg | 12 | 11.5 | 11 | 13 |
| 200 Fann Rdg | 9 | 8 | 7.5 | 9.5 |
| 100 Fann Rdg | 5.5 | 5 | 4 | 5.5 |
| 6 Fann Rdg | 1 | 1 | 0 | 1.5 |
| 3 Fann Rdg | 1 | 0.5 | 0 | 1.0 |
| IG, lb./100 sq. ft | 0 | 0 | 0 | 0 |
| 10G, lb./100 sq. ft | 9 | 8 | 0.5 | 2 |
| pH | 8.8 | 9.1 | 9.2 | 9.8 |
| API Filtrate, ml | 13.7 | 12.0 | 10.4 | 12.5 |
| pH Readjusted to | 9.6 | 9.7 | 9.7 | 10.0 |
| Amount, gram | ¹0.5 | 0.2 | 0.2 | 0.17 |

Flow Properties After Muds Aged at 300° F.

| | NaOH | Ortho-silicate | Ex. 1 | Ex. 2 |
|---|---|---|---|---|
| 600 Fann Rdg | 32 | 28 | 20 | 25 |
| 300 Fann Rdg | 22 | 17.5 | 10.5 | 15 |
| 200 Fann Rdg | 18 | 14 | 7.5 | 12 |
| 100 Fann Rdg | 14 | 10 | 4 | 8 |
| 6 Fann Rdg | 12.5 | 5 | 0.4 | 3 |
| 3 Fann Rdg | 11.5 | 4 | 0.5 | 3 |
| IG, lb./100 sq. ft | 6 | 0 | 0 | 0 |
| 10G, lb./100 sq. ft | 49 | 31 | 5 | 27 |
| pH | 7.3 | 7.5 | 7.5 | 7.6 |
| API Filtrate, ml | 13.5 | 11.4 | 11.0 | 12.0 |

¹ Cubic centimeter.

The sodium silicates employed in this invention are alkaline in solution, and the pH of the various silicate solutions is proportional to the $Na_2O$ present. Electrometric titrations with acid has demonstrated that the high pH of silicate solutions are maintained until the alkali is almost completely neutralized and that this buffer capacity increases with increasing proportions of soluble silica.

Initial investigations demonstrated the ability of sodium orthosilicate and sodium metasilicate to activate organic polyelectrolyte clay suspension and subsequently induce a reduction in flow properties, which in non-contaminated tests, were more significant than that obtained from a comparable caustic soda treatment. It was noted that the muds containing simple silicate materials had higher API filtrates than the caustic-treated muds. Accordingly, it was necessary to develop a pH control agent capable of avoiding high filtration losses as well as maintaining the necessary pH for good rheological properties superior to that afforded by either caustic soda or sodium silicates. The instant invention of the buffer drilling mud additive employing the reaction product of organic polyelectrolyte and sodium silicate, with potassium hydroxide, has provided a synergistic effect in the alleviation of the water loss problem as well as providing improved viscometric properties which were especially significant after aging the muds at 300° F. and comparable temperatures. Further, the problem of preventing clay base exchange reactions has been substantially solved. The long-term stability is therefore far superior to that afforded by caustic soda. The buffered drilling mud additive of this invention induces reduction in viscosity in various organic polyelectrolyte treated systems, such as the Uni-Cal, mentioned above, as well as Q-Broxin, which are both lignosulfonates, and, in addition, works advantageously on lignite treated muds to provide results that are much more significant than that obtained from the addition of caustic soda.

The reaction product of the present invention is believed to be based upon several possible complex reactions or bonding between the potassium hydroxide, organic polyelectrolyte and sodium silicates. It is necessary that such reaction or bonding between the potassium hydroxide, silicate and organic polyelectrolyte must occur before the additive is dispersed in drilling mud (normally containing a thinner or deflocculant) in order to achieve the advantages set forth herein. If the ingredients used in the reaction product of this invention are separately added to the clay, or thinner or mixture thereof, the silicate will react with the clay and the organic material, such as lignosulfonate, used as the thinner. Such use of silicates and organic polyelectrolytes does not give long-term mud stability and inertness to formation clays achieved by used of the composition of this invention under conditions encountered in actual drilling operations.

Figure 2:
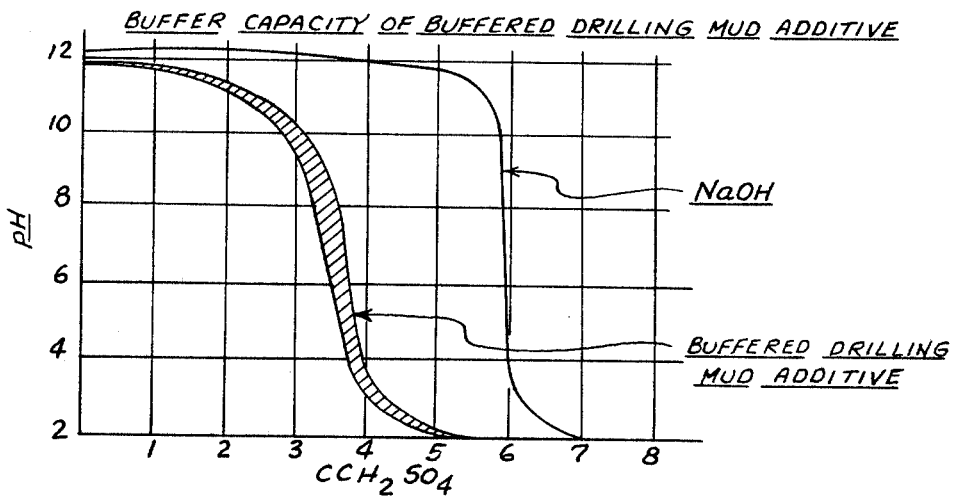
FIG. 2 shows a curve giving the buffer capacity of the buffer drilling mud additive as contrasted to sodium hydroxide.

To illustrate the comparative alkalinity and buffering and neutralization properties of the buffered mud additive of this invention as compared to caustic soda, reference is made to FIGS. 1 and 2. FIG. 1 shows the comparable pH values of the buffered drilling mud additive and caustic soda as their concentration varies. FIG. 2 shows the buffer capacity of the buffered drilling mud additive as compared to caustic soda. As shown in FIG. 2, it is most difficult to "creep-up" on the pH of the solution or suspensions treated with caustic soda, and, invariably, should a pH of 9.5 be desired as an example, as is quite often the case in drilling mud systems, this pH cannot be easily obtained. This is to be contrasted with the buffered drilling mud additive curve where a workable range is provided so that the pH can be easily obtained without fear of overshooting the desired pH.

Figure 3:
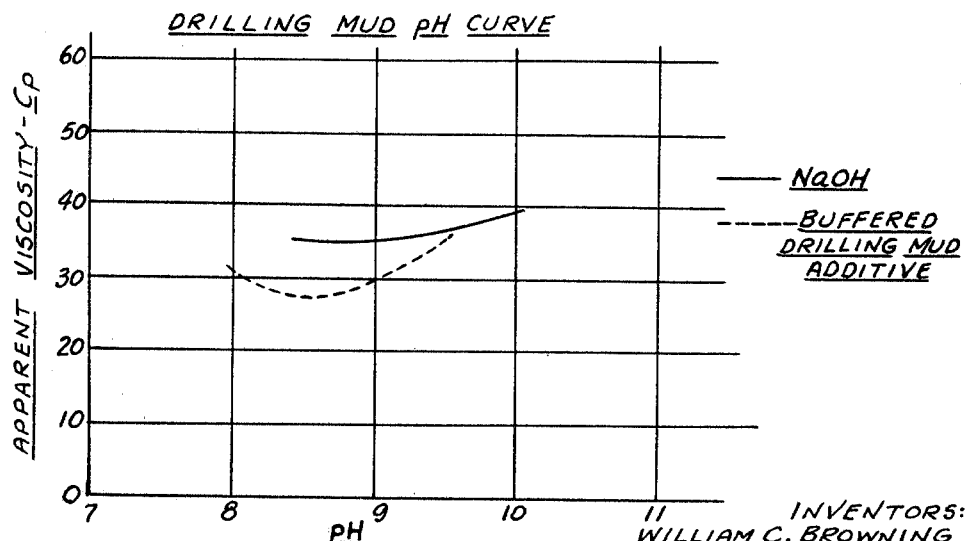
FIG. 3 shows the comparative viscosities of a Uni-Cal mud treated with the caustic soda and one treated with the buffered drilling mud additive at varying pH's.

FIG. 3 shows a typical Uni-Cal mud pH curve where the pH is controlled on the one hand by sodium hydroxide and on the other hand by the buffered mud additive. This curve shows that the viscosity of the mud system is substantially reduced at a lower pH for the buffered drilling mud additive as compared to the use of caustic soda. FIG. 4 shows the difference between the effect of NaOH and synergic on clay slurries of 27.4 illite suspended solids over extended time. The increase in viscosity of the clay slurry treated with NaOH is due to hydroxyl clay cleavage which results in an increase in surface area of the clay particles.

A typical application of the buffer drilling mud additive of this invention will be described in drilling the Anahuac and Frio shales along the Texas Gulf Coast. These shales have been quite troublesome and have affected both drilling operations and mud control. While drilling these shales, penetration rates have been usually controlled to prevent bit balling and sloughing. In addition, a slower drilling rate is often necessary to clean out the hole and to catch up on the mud treatment. Such practices have invariably increased overall drilling costs because more drilling days have been required to reach total depth. The employment of the buffered drilling mud additive of this invention, such as the product of Example 1 has been employed to obtain optimum performance in drilling these shales, in meeting the capabilities of handling the greatest possible drilling rates and eliminating time consuming operations such as reaming tight spots, circulating bottoms-up, short trips, or conditioning mud. The mud has exhibited minimum yield points to utilize the maximum available hydraulic horsepower for optimum penetration rates. Further, the mud has been easy to control and maintain with chemical treatment costs kept at a reasonable limit.

A typical example of use for the product of Example 1 has been that for a Brazoria County drilling operation in Texas. After setting 2000 feet of 10¾ inch surface casing, a 9⅞ inch hole was drilled to 6800 feet. At 6800 feet, the mud system was converted to an organic polyelectrolyte and specifically a Uni-Cal oil emulsion mud employing 5 pounds per barrel of Uni-Cal and 1½ pounds per barrel of the drilling mud additive of Example 1, and 10% by volume diesel oil. At this time the mud had the following properties:

| | |
|---|---|
| Mud weight, p.p.g. | 9.1 |
| Funnel viscosity, sec. | 43 |
| Apparent viscosity, cp. | 17 |
| Plastic viscosity, cp. | 12 |
| Yield point, lb./100 sq. ft. | 8 |
| Gels, lb./100 sq. ft. | 0/8 |
| API filtrate, ml. | 4.9 |
| Percent oil by volume | 9.5 |
| Percent solids by volume | 10 |
| pH | 8.1 |
| Chlorides, p.p.m. | 1800 |
| Calcium, p.p.m. | 70 |

The above properties were obtained at a time when rapid drilling rates make it most difficult to condition the mud. These properties, although not considered ideal from a plastic viscosity to yield point ratio relationship, were all that were required for maximum penetration rates. With the mud doing all that was required, the operating personnel saw no need to spend additional money to condition the mud to improve the plastic viscosity to yield point ratio. This particular mud served to drill more than 1700 feet of hole in two days after the initial mud conversion. With such penetration rates it becomes a matter of necessity not to attempt to establish high plastic viscosity to yield point ratios. This is simply a practical situation where less than ideal mud characteristics provide satisfactory and safe fast hole drilling at a desired cost.

At greater depths into the Frio shale, the pH of the mud was gradually raised to 9.0 with the buffered drilling mud additive. An improvement in the flow properties of the mud were noted when the pH was raised. The pH was then maintained between 9.0 and 9.2 for the remainder of the drilling operation. On the fifth day after conversion at 9,780 feet, the mud exhibited the following properties:

| | |
|---|---|
| Mud weight, p.p.g. | 11.0 |
| Funnel viscosity, sec. | 48 |
| Apparent viscosity, cp. | 29 |
| Plastic viscosity, cp. | 27 |
| Yield point, lb./100 sq. ft. | 4 |
| Gels, lb./100 sq. ft. | 0/0 |
| API filtrate, ml. | 3.8 |
| Percent oil by volume | 9.0 |
| Percent solids by volume | 17.5 |
| pH | 9.0 |
| Chlorides, p.p.m. | 2300 |
| Calcium, p.p.m. | 100 |
| Pf, ml. | Trace |

Recommended tourly (8 hour tour) treatments at this time included 10 bags of Uni-Cal and 5 cans of the buffered drilling mud additive. Observation of the Anahuac shale coming over the shaker showed a distinct difference from that observed on previous wells in this area. The extreme gumbo-like condition of the cuttings normally observed with the Anahuac shale was conspicuously absent. In contrast, the shale particles were true bit cuttings with distinct angular edges. In addition, the amount of cuttings appeared to approximate the actual volume of hole drilled showing the absence of swelling. Drilling to target depth was then accomplished without difficulty. During trips for new bits, no abnormal drag was encountered either going in or coming out of the hole.

There was no evidence of fill up when running the bit to bottom. At no time was the penetration rate held back because of poor hole conditions or time required to condition mud. The excellent drilling performance of this mud made it possible to drill to a total depth of 10,805 feet through the Anahuac in 13 days. In contrast to the performance of this mud, a recently drilled offset well required 20 days to reach a total depth of 10,620 feet. The reductions of 7 to 8 days' rig time with the mud employing the buffered drilling mud additive resulted in a substantial savings to the operator with the achievement of high performance characteristics.

Various changes and modifications may be made within this invention as will be readily apparent to those skilled in the art. Such changes, such as changes in ranges and substitution of chemical equivalence, are within the scope and teaching of this invention as defined by the claims appended hereto.

We claim:

1. An alkalizing drilling mud additive providing corrosion resistant and buffering control properties consisting essentially of the reaction product formed by mixing together in an aqueous solution from 5 to 30% by weight potassium hydroxide, 2 to 30% by weight of an organic polyelectrolyte, 40 to 78% by weight sodium silicate having a ratio of about $2Na_2O:1SiO_2$, said organic polyelectrolyte being at least one member of the group consisting of (a) a lignosulfonate, (b) a lignite, and (c) a bark extract which is a sulfonate salt of hydroxy aromatic polymeric compounds obtained from the group consisting of Douglas fir, Amabilis fir, and Southern pine.

2. The additive of claim 1 in which the organic polyelectrolyte is a sulfonate salt of hydroxy aromatic polymeric compounds obtained from the group consisting of Douglas fir, Amabilis fir and Southern pine.

3. A drilling mud providing corrosion resistant and buffered control properties consisting essentially of clayey particles, water, and an alkalizing drilling mud additive, said additive consisting essentially of the reaction product formed from 5 to 30% potassium hydroxide, 40 to 78% sodium silicate having a ratio of about $2Na_2O:1SiO_2$ and 2 to 30% by weight of an organic polyelectrolyte, which is at least one member of the group consisting of (a) a lignosulfonate, (b) a lignite, and (c) a bark extract which is a sulfonate salt of hydroxy aromatic polymeric compounds obtained from the group consisting of Douglas fir, Amabilis fir and Southern pine.

4. A drilling mud providing corrosion resistant and buffered control properties consisting essentially of clayey particles, water, and organic polyelectrolyte deflocculant and an alkalizing drilling mud additive, said additive consisting essentially of the reaction product form from mixing in an aqueous soution 5 to 30% by weight potassium hydroxide, 40 to 78% by weight sodium silicate having a ratio of about $2Na_2O:1SiO_2$, 2 to 30% by weight of an organic polyelectrolyte which is at least one member of the group consisting of (a) a lignosulfonate, (b) a lignite, and (c) a bark extract which is a sulfonate salt of hydroxy aromatic polymeric compounds obtained from the group consisting of Douglas fir, Amabilis fir and Southern pine.

5. The drilling mud of claim 4 in which the organic polyelectrolyte is said bark extract, said bark extract being a water soluble alkaline bark extract derivative obtained from the group consisting of Douglas fir, Amabilis fir and Southern pine.

6. A drilling mud providing corrosion resistant and buffering control properties consisting essentially of clayey particles, water, a lignosulfonate containing chromium, and an alkalizing drilling mud additive, said additive consisting essentally of the reacton product of (a) 40 to 78% sodium silicate in which the sodium silicate has a proportion of about $2Na_2O:1SiO_2$, (b) 2 to 30% by weight of a sulfonate salt of hydroxy aromatic polymeric compounds obtained from the group consisting of Douglas fir, Amabilis fir and Southern pine, and (c) 5 to 30% potassium hydroxide.

References Cited
UNITED STATES PATENTS

| | | |
|---|---|---|
| 2,109,858 | 3/1938 | Cannon. |
| 2,133,759 | 10/1938 | Vail et al. |
| 2,205,609 | 6/1940 | Vail et al. |
| 2,357,565 | 9/1944 | Vietti et al. |
| 2,650,194 | 6/1953 | Rahn. |
| 2,935,473 | 5/1960 | King et al. |
| 2,999,108 | 9/1961 | Gray et al. |
| 3,009,874 | 11/1961 | Chisholm. |

HERBERT B. GUYNN, Primary Examiner

UNITED STATES PATENT OFFICE
CERTIFICATE OF CORRECTION

Patent No. 3,511,779　　　　　　　　Dated May 12, 1970

Inventor(s) William C. Browning et al

It is certified that error appears in the above-identified patent and that said Letters Patent are hereby corrected as shown below:

Column 1, line 4, "Milchen" should read -- Milchem --

Column 3, line 60, "$SiO_3$" should read -- $SiO_2$ --

Column 6, Table between lines 30-35, change as follows:

3 Fann Rdg., Ex. 2 column, "1.0" should read -- 1.5 --

IG, lb./100 sq. ft, Ex. 2 column, "9" should read -- 0 --

10G, lb./100 Sq. Ft., Ex. 2 column, "2" should read -- 9 -- pH, Ex. 2 column, "9.8" should read -- 9.2 --

API Filtrate, ml, Ex. 2 column, "12.5" should read -- 12.8 --

Column 7, line 24, "used" should read -- use --

Column 7, line 27, after "buffered" insert -- drilling --

SIGNED AND SEALED
NOV 3 1970

(SEAL)
Attest:

Edward M. Fletcher, Jr.
Attesting Officer

WILLIAM E. SCHUYLER, JR.
Commissioner of Patents